Feb. 23, 1954     C. S. SZEGHO ET AL     2,670,279
PROCESS FOR PRODUCTION LOW-GLARE CATHODE-RAY TUBES
Filed June 23, 1950
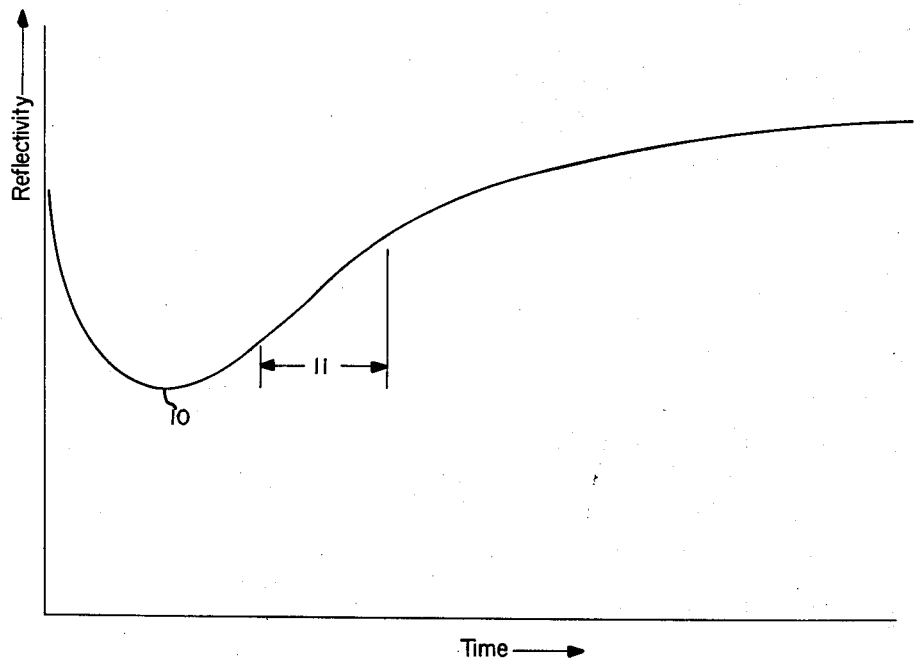
CONSTANTIN S. SZEGHO
WILLIAM O. REED
MARK E. AMDURSKY
*INVENTORS.*
BY *Francis W. Crotty*
THEIR ATTORNEY Patented Feb. 23, 1954

2,670,279

UNITED STATES PATENT OFFICE 2,670,279

PROCESS FOR PRODUCING LOW-GLARE CATHODE-RAY TUBES

Constantin S. Szegho, William O. Reed, and Mark E. Amdursky, Chicago, Ill., assignors to The Rauland Corporation, a corporation of Illinois Application June 23, 1950, Serial No. 169,998

6 Claims. (Cl. 41—42)

This invention relates to the treatment of cathode-ray tube face plates and more particularly to a novel method of imparting low-glare or anti-reflection properties to the glass face plate of a cathode-ray tube.

Present-day commercial television receivers of the direct-view type employ cathode-ray tubes having polished glass face plates for the reproduction of the video information. Direct-view image reproduction has become generally recognized as superior to other types in providing greater contrast and picture detail. However, the polished glass face plate of a cathode-ray tube is highly reflective with respect to external light, and light reflections at the face plate often may become so great as to detract materially from the quality of the reproduced image.

There are many processes known to the art for rendering glass surfaces anti-reflective. For instance, a skeletonized film having a thickness of substantially one quarter-wavelength of the incident light may be used to impart low-glare properties to the glass. Generally, however, skeletonized films do not provide uniform anti-glare properties throughout the entire visual spectrum since they provide optimum interference effects only for light of a particular frequency. Other processes known to the art, such as those involving sand blasting or the like, are not practical for application in imparting low-glare properties to a cathode-ray tube face plate because of the attendant loss of picture detail due to excessive diffusion of light originating internally of the tube at the luminescent screen.

It is, therefore, an important object of the invention to provide a novel process for rendering the glass face plate of a cathode-ray tube substantially non-reflective with respect to light from external sources without having any appreciable adverse effect on the detail of image reproduction by the tube.

More particularly, it is the primary object of the invention to provide a novel method of rendering the glass face plate of a cathode-ray tube substantially non-reflective with respect to light from external sources without substantially affecting its light-transmission properties with respect to light developed internally of the tube by electron-beam excitation of a luminescent screen supported adjacent the inner surface of the face plate.

In accordance with the invention, the desired low-glare or anti-reflecting properties are imparted to the glass face plate of a cathode-ray tube without adversely affecting the picture detail by a novel process which comprises the steps of blasting the outer surface of the face plate with a liquid suspension of a pulverulent abrasive material, subsequently etching the entire outer surface with hydrofluoric acid. The etching step is terminated prior to the restoration of full specular reflectivity to the outer surface to render the face plate diffusely reflective to external light while permitting substantially specular transmission of light originating at the luminescent screen. The process may be carried out either before or after assembly of the face plate to the remainder of the cathode-ray tube envelope.

The features of the present invention which are believed to be novel are set forth with particularity in the appended claims. The invention, together with further objects and advantages thereof, may best be understood, however, by reference to the following description taken in connection with the accompanying drawing, in which the single figure is a graphical representation of an operating characteristic of the process of the present invention.

In accordance with the invention, the entire outer surface of the glass face plate of a cathode-ray tube is first blasted with a liquid suspension of a pulverulent abrasive material, and the entire outer surface is then subjected to hydrofluoric acid etching. The hydrofluoric acid etching is terminated prior to the restoration of full specular reflectivity to the outer surface to render the face plate diffusely reflective to external light while permitting substantially specular transmission of light originating at the luminescent screen which is supported adjacent the inner surface of the face plate. It has been found that cathode-ray tube face plates which have been so treated provide excellent low-glare or anti-reflecting properties with respect to external light without excessively diffusing the image reproduced at the luminescent screen.

More particularly, and in greater detail, the desired low-glare properties are imparted to the outer surface of the face plate in accordance with the following procedure. The face plate is first subjected to the blasting action of a liquid suspension of pulverulent abrasive material under pressure. Preferably, the abrasive material comprises particles of a fineness of the order of 1,000 mesh; finer particles are quite acceptable but require greater blasting time, while coarser particles cause the finished surface to be excessively diffusive. Preferably, the pressure at which the suspension is directed at the outer surface of the face plate is in the range from 80 to 90 pounds per square inch.

As an illustrative example, a suspension of decomposed silica particles of a fineness of 1250 mesh (particle size of about 10 to 15 microns) in a solution of water and a detergent or wetting agent, directed at the face plate at a pressure of 80 or 90 pounds per square inch, has been used with eminent success. An abrasive suspension of this type is commercially available under the trade name "Novaculite," merchandized by the Vapor Blast Company of Milwaukee, Wisconsin. The blasting process may conveniently be carried out by passing the stream of abrasive suspension across the face plate in accordance with a predetermined scanning pattern, which may for example be similar to that of a cathode-ray beam in scanning the fluorescent screen. For example, the pressurized abrasive suspension stream may be caused to scan the face plate for a total time of about two minutes in a bidirectional pattern, several horizontal passes being provided for each vertical pass or vice versa.

The liquid suspension of pulverulent abrasive material attacks the glass surface and roughens it; in this condition the treated surface is low-reflective to external light but is so diffusive with respect to transmitted light as to render it unsuitable for use in a cathode-ray tube.

In order to restore suitable light-transmission properties to the face plate, the roughened outer surface is subjected to the chemical action of hydrofluoric acid. As is well known, hydrofluoric acid attacks glass by leaching out the silica content. The roughened outer surface is somewhat smoothed to a condition of substantial light-transparency with respect to light originating immediately adjacent the inner surface by a carefully controlled hydrofluoric acid etching.

The action of the acid on a typical surface may best be understood by reference to the single figure of the drawing, which qualitatively shows the dependence of reflectivity on time of acid-treatment. The surface, after being subjected to the blasting action of the abrasive suspension, has a reflectivity of about 50 per cent of that of a conventional neutral-tinted glass face plate as measured at an angle of substantially 35 degrees from normal with a collimated beam of light. Although still quite transparent, the surface has a misty appearance which produces a somewhat diffuse transmitted image quite objectionable for television applications. As the acid treatment is continued, the reflection decreases and the diffusion of transmitted light increases until a point 10 of minimum reflection is reached. With further acid treatment, the reflected light becomes substantially diffuse and the transmitted light becomes more specular. This can be explained by the fact that the acid tends to smooth the surface. Light incident on the outer surface is reflected diffusely from a multitude of small hill-like structures while transmitted light originating immediately adjacent the inner surface, passes through with little scattering.

It is believed that during the first part of the acid-etching cycle, the acid tends to further roughen the surface until a minimum reflectivity is reached whereupon, due to the fact that there is a trapping of the acid in the pits created by the blasting step, the high spots are subjected to more concentrated acid action and a smoothing effect is produced. It is noted that the increase in reflectivity is accomplished much more slowly as the smoothing action progresses, since the ratio of roughened surface area to smooth surface area is much greater after the minimum has been reached than before, and more acid reaction is required. To be suitable for use in a cathode-ray tube, the reflectivity must be within a range 11 on the rising portion of the operating characteristic.

The same diffusing effect may be achieved by blasting the plate for a longer period of time until the surface is substantially non-reflective, so that no operating range of decreasing reflectivity with etching time is encountered at the beginning of the cycle. When a plate which has been blasted to this extent is treated with acid, the diffuse reflection continually increases with acid-etching time from an initial minimum corresponding to point 10 in the figure, with a consequent improvement in transmitted image quality as the treatment is continued. However, this latter procedure is more time-consuming than the preferred operating conditions represented by the figure.

The hydrofluoric acid etching of the outer surface is preferably accomplished by immersing the surface in a hydrofluoric acid bath of concentration greater than 15 per cent by weight at a temperature between 20° C. and 35° C.; for hydrofluoric acid concentrations below 15 per cent, the etching action is too slow to be commercially feasible. A hydrofluoric acid concentration of 40 per cent at a temperature of 32° C. has been found to smooth a $\frac{5}{32}$-inch window glass face plate to the desired extent in about 20 seconds; a somewhat longer time is required for treatment of glass of the type used in all-glass tubes. The operating conditions set forth by way of example have been found suitable for a $\frac{5}{32}$-inch window glass face plate in common use for 12-inch and 16-inch metal-cone cathode-ray tubes. It has been found that the amount of diffusion of a transmitted image increases as the thickness of the face plate increases so that some variation in the operating conditions may be required in treating face plates of greater or less thickness.

As a practical matter, it is possible to obtain the desired low-glare properties only at the expense of some sacrifice in picture definition. Prior art processes for rendering glass surfaces non-reflective generally affect the glass surface in such a way as to cause too great a change in the light-transmission properties of the glass to permit its use in precision applications such as television receiver picture tubes. The process of the present invention represents a material contribution to the art in enabling a glass surface to be so treated as to become substantially non-reflective without excessively increasing the diffusion of transmitted light.

Since the diffusion properties of the face plate must be maintained below a certain practical limit determined by the picture definition requirements, it is apparent that the operating conditions of the process may become quite critical in practice. For example, if the hydrofluoric acid concentration in the second step is too low, or if the ambient temperature is too low, the etching time required to provide the desired finish becomes excessive, while if the acid concentration or ambient temperature is too high, the process is not readily subject to precision control on a mass production basis.

The condition of the outer surface of a cathode-ray tube face plate treated in accordance with the present invention appears to be characterized by a highly uniform distribution of minute convex protuberances. In other words, when viewed under a high-powered microscope, the surface appears globuliferous and apparently comprises a rather regular distribution of rounded hills or nodules ranging in height between about 5 and 20 microns and in diameter between about 5 and 100 microns. Such a surface has been found to afford excellent low-glare properties throughout the entire visual spectrum with a sufficiently small sacrifice in the diffusion properties with respect to transmitted light as to keep the loss of picture definition within tolerable limits when the process is used on the face plate of a cathode-ray tube. A cathode-ray tube having a low-glare viewing plate of this type is specifically disclosed and claimed in the copending application of Constantin S. Szegho et al., Serial No. 169,997, filed concurrently herewith, for Image-Reproducing Devices, now U. S. Patent 2,612,612, issued September 30, 1952 and assigned to the present assignee.

In some applications, as specifically disclosed and claimed in the copending application of Constantin S. Szegho et al., Serial No. 169,996, filed concurrently herewith, for Image-Reproducing Devices, now U. S. Patent 2,612,611, issued September 30, 1952 and assigned to the present assignee, it has been found that the low-glare properties of the face plate may be enhanced at a smaller sacrifice in picture detail by relieving both the inner and outer surfaces of the glass viewing plate. It is of course contemplated, therefore, that the process of the present invention may be utilized to treat either the outer surface alone or both the inner and outer surfaces. Moreover, the invention may be applied with advantage in the manufacture of both all-glass picture tubes and metal-cone picture tubes.

While a particular embodiment of the present invention has been described, it is apparent that various changes and modifications may be made, and it is therefore contemplated in the appended claims to cover all such changes and modifications as fall within the true spirit and scope of the invention.

We claim:

1. In the method of making a cathode-ray tube having a glass face plate which is substantially non-reflective with respect to light from external sources and having a luminescent screen supported adjacent the inner surface of said face plate, the steps comprising: blasting the entire outer surface of said face plate with a liquid suspension of a pulverulent abrasive material; subsequently etching said entire outer surface with hydrofluoric acid; and terminating said etching step prior to the restoration of full specular reflectivity to said outer surface to render said face plate diffusely reflective to external light while permitting substantially specular transmission of light originating at said luminescent screen.

2. In the method of making a cathode-ray tube having a glass face plate which is substantially non-reflective with respect to light from external sources and having a luminescent screen supported adjacent the inner surface of said face plate, the steps comprising: blasting the entire outer surface of said face plate with a liquid suspension of a pulverulent abrasive material of fineness of the order of 1,000 mesh; subsequently etching said entire outer surface with hydrofluoric acid; and terminating said etching step prior to the restoration of full specular reflectivity to said outer surface to render said face plate diffusely reflective to external light while permitting substantially specular transmission of light originating at said luminescent screen.

3. In the method of making a cathode-ray tube having a glass face plate which is substantially non-reflective with respect to light from external sources and having a luminescent screen supported adjacent the inner surface of said face plate, the steps comprising: blasting the entire outer surface of said face plate with a liquid suspension of a pulverulent abrasive material of fineness of the order of 1,000 mesh, at a pressure of from 80 to 90 pounds per square inch; subsequently etching said entire outer surface with hydrofluoric acid; and terminating said etching step prior to the restoration of full specular reflectivity to said outer surface to render said face plate diffusely reflective to external light while permitting substantially specular transmission of light originating at said luminescent screen.

4. In the method of making a cathode-ray tube having a glass face plate which is substantially non-reflective with respect to light from external sources and having a luminescent screen supported adjacent the inner surface of said face plate, the steps comprising: blasting the entire outer surface of said face plate with a liquid suspension of decomposed silica particles of fineness of the order of 1,000 mesh; subsequently etching said entire outer surface with hydrofluoric acid; and terminating said etching step prior to the restoration of full specular reflectivity to said outer surface to render said face plate diffusely reflective to external light while permitting substantially specular transmission of light originating at said luminescent screen.

5. In the method of making a cathode-ray tube having a glass face plate which is substantially non-reflective with respect to light from external sources and having a luminescent screen supported adjacent the inner surface of said face plate, the steps comprising: blasting the entire outer surface of said face plate with a liquid suspension of a pulverulent abrasive material; subsequently etching entire outer surface with an aqueous solution of hydrofluoric acid of concentration greater than 15 per cent at a temperature between 20° C. and 35° C.; and terminating said etching step prior to the restoration of full specular reflectivity to said outer surface to render said face plate diffusely reflective to external light while permitting substantially specular transmission of light originating at said luminescent screen.

6. In the method of making a cathode-ray tube having a glass face plate which is substantially non-reflective with respect to light from external sources and having a luminescent screen supported adjacent the inner surface of said face plate, the steps comprising: blasting the entire outer surface of said face plate with a liquid suspension of decomposed silica of fineness of the order of 1,000 mesh at a pressure of from 80 to 90 pounds per square inch; and subsequently etching said entire outer surface with an aqueous solution of hydrofluoric acid of concentration greater than 15 per cent at a temperature between 20° C. and 35° C.; and terminating said etching step prior to the restoration of full specular reflectivity to said outer surface to render said face plate diffusely reflective to external light while permitting substantially specular transmission of light originating at said luminescent screen.

CONSTANTIN S. SZEGHO.
WILLIAM O. REED.
MARK E. AMDURSKY.

References Cited in the file of this patent

UNITED STATES PATENTS

| Number | Name | Date |
| --- | --- | --- |
| 415,229 | Tilghman et al. | Nov. 19, 1899 |
| 1,240,398 | Wood | Sept. 18, 1917 |